US012766455B2

(12) United States Patent
Ishikawa et al.

(10) Patent No.: US 12,766,455 B2
(45) Date of Patent: Oct. 20, 2026

(54) CARBON DIOXIDE SEPARATOR

(71) Applicant: FUTABA INDUSTRIAL CO., LTD., Okazaki (JP)

(72) Inventors: Hiromi Ishikawa, Okazaki (JP); Kenta Isago, Okazaki (JP); Masatoshi Kato, Okazaki (JP); Michiaki Amaya, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 331 days.

(21) Appl. No.: 18/671,291

(22) Filed: May 22, 2024

(65) Prior Publication Data

US 2024/0408534 A1 Dec. 12, 2024

(30) Foreign Application Priority Data

Jun. 8, 2023 (JP) ................................ 2023-094852

(51) Int. Cl.
*B01D 53/22* (2006.01)
*B01D 53/04* (2006.01)
(Continued)

(52) U.S. Cl.
CPC ....... *B01D 53/0407* (2013.01); *B01D 53/261* (2013.01); *B01D 53/265* (2013.01); *F01N 3/005* (2013.01); *F01N 3/0205* (2013.01); *B01D 2253/108* (2013.01); *B01D 2257/504* (2013.01); *B01D 2257/80* (2013.01); *B01D 2259/4566* (2013.01)

(58) Field of Classification Search
CPC .............. B01D 53/0407; B01D 53/261; B01D 53/265; B01D 2253/108; B01D 2257/504; B01D 2257/80; B01D 2259/4566; F01N 3/005; F01N 3/0205
See application file for complete search history.

(56) References Cited

U.S. PATENT DOCUMENTS 4,899,544 A * 2/1990 Boyd .................... F01K 23/103
60/618
4,977,745 A * 12/1990 Heichberger .......... F25J 3/0257
62/928
(Continued)

FOREIGN PATENT DOCUMENTS

JP 2022152289 A 10/2022

OTHER PUBLICATIONS

Notice of Reasons for Refusal for Japanese Patent Application No. 2023094852, mailed May 7, 2025, 6 pages.

*Primary Examiner* — Anthony Shumate
(74) *Attorney, Agent, or Firm* — Withrow + Terranova, PLLC; Vincent K. Gustafson

(57) ABSTRACT

A carbon dioxide separator includes a dehydrator, a carbon dioxide collector, and a draining structure. The dehydrator is configured to remove moisture contained in an exhaust gas flowing in from a heat exchanger. The carbon dioxide collector is configured to adsorb and/or absorb carbon dioxide contained in the exhaust gas that has passed through the dehydrator. The draining structure is provided, on a flow path for the exhaust gas between the heat exchanger and the dehydrator, to inhibit water resulting from condensation in the exhaust gas from moving along the flow path to flow into the dehydrator.

12 Claims, 7 Drawing Sheets

(51) Int. Cl.
*B01D 53/26* (2006.01)
*F01N 3/00* (2006.01)
*F01N 3/02* (2006.01)

(56) References Cited

U.S. PATENT DOCUMENTS

| | | | | |
|---|---|---|---|---|
| 5,319,176 | A * | 6/1994 | Alvi | C03B 19/1045<br>219/121.36 |
| 8,715,401 | B2 * | 5/2014 | Baxter | B01D 53/002<br>95/108 |
| 10,537,846 | B2 * | 1/2020 | Häfner | B01D 53/1475 |
| 12,134,069 | B2 * | 11/2024 | Holman | B01D 53/0462 |
| 2006/0248921 | A1 * | 11/2006 | Hosford | B01D 53/047<br>62/611 |
| 2012/0039430 | A1 * | 2/2012 | Abel | E21B 43/2403<br>376/325 |
| 2013/0186075 | A1 | 7/2013 | Myers et al. | |
| 2016/0130515 | A1 * | 5/2016 | Edlund | C10L 3/101<br>422/162 |
| 2016/0131424 | A1 * | 5/2016 | Edlund | C10L 3/106<br>62/625 |
| 2019/0085279 | A1 * | 3/2019 | Leo | A01K 67/36 |
| 2021/0251157 | A1 * | 8/2021 | Leo | A01G 22/00 |
| 2025/0198698 | A1 * | 6/2025 | Hofer | B01D 53/002 |

* cited by examiner

CARBON DIOXIDE SEPARATOR

CROSS-REFERENCE TO RELATED APPLICATIONS

This application claims the benefit of Japanese Patent Application No. 2023-094852 filed on Jun. 8, 2023 with the Japan Patent Office, the entire disclosure of which is incorporated herein by reference.

BACKGROUND

The present disclosure relates to a carbon dioxide separator.

Carbon dioxide separators that separate carbon dioxide from exhaust gas are already known (see, for example, Japanese Unexamined Patent Application Publication No. 2022-152289). Such a carbon dioxide separator is provided in an exhaust system of an internal combustion engine, for example. The carbon dioxide separator comprises a water adsorber and a carbon dioxide adsorber. The water adsorber is configured to adsorb water contained in the exhaust gas that flows in from the internal combustion engine. The carbon dioxide adsorber is configured to adsorb carbon dioxide contained in the exhaust gas that flows in from the water adsorber.

In the carbon dioxide adsorber, for example, lithium composite oxide, zeolite, or the like is used as a carbon dioxide adsorbent. The carbon dioxide adsorbent has a property that, when a large amount of water is present in the atmosphere, an amount of carbon dioxide adsorbed decreases significantly. Thus, a dehydration on the exhaust gas is performed in the water adsorber.

SUMMARY

In a case where dehydration of the exhaust gas is carried out using an adsorbent, the larger the amount of water flowing into the water adsorber is, the more adsorbent needs to be loaded in the water adsorber in order to adsorb such water. In other words, the larger the amount of water flowing into a dehydrator, the higher dehydration capacity is required of the dehydrator.

Accordingly, in one aspect of the present disclosure, it is desirable to be able to provide a carbon dioxide separator that requires less dehydration capacity for treatment of exhaust gas, thus enabling effective adsorption of carbon dioxide.

In one aspect of the present disclosure, a carbon dioxide separator is provided. The carbon dioxide separator comprises a dehydrator, a carbon dioxide collector, and a draining structure.

The dehydrator is connected to a heat exchanger. The heat exchanger is configured to cool an exhaust gas discharged from an internal combustion engine. The dehydrator is configured to remove moisture contained in the exhaust gas flowing in from the heat exchanger.

The carbon dioxide collector is configured to adsorb and/or absorb carbon dioxide contained in the exhaust gas that has passed through the dehydrator. The draining structure is provided on a flow path for the exhaust gas between the heat exchanger and the dehydrator. The draining structure is provided to inhibit water resulting from condensation in the exhaust gas from moving along the flow path to flow into the dehydrator.

By providing the draining structure on the flow path for the exhaust gas between the heat exchanger and the dehydrator, an amount of the water flowing into the dehydrator can be reduced. Accordingly, the above-described carbon dioxide separator requires less dehydration capacity for treatment of the exhaust gas, thus enabling effective adsorption and/or absorption of carbon dioxide.

In one aspect of the present disclosure, the carbon dioxide collector may comprise zeolite as a carbon dioxide adsorbent. Zeolite has a property of adsorbing not only carbon dioxide but also water. Provision of the above-described draining structure in the carbon dioxide separator including the adsorbent with such a property makes it possible to effectively inhibit the water from decreasing a capacity of adsorbing carbon dioxide in the carbon dioxide collector.

In one aspect of the present disclosure, the carbon dioxide separator may be mounted in a vehicle including the internal combustion engine. By being able to lower the required dehydration capacity, the size of the carbon dioxide separator can be reduced. The carbon dioxide separator with a smaller size and a higher carbon dioxide absorptive capacity is suitable for being mounted in vehicles.

In one aspect of the present disclosure, the draining structure may comprise a recessed structure. The recessed structure may be configured to collect the water resulting from condensation in the exhaust gas. The draining structure may include a draining port. The draining port may be configured to discharge the water collected by the recessed structure. Provision of the recessed structure enables effective inhibition of inflow of the water into the dehydrator.

In one aspect of the present disclosure, the draining port may include a valve configured to control a timing of draining. In the carbon dioxide separator including the valve, the water can be discharged at an appropriate timing by control of the valve.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

First Embodiment

Figure 1:
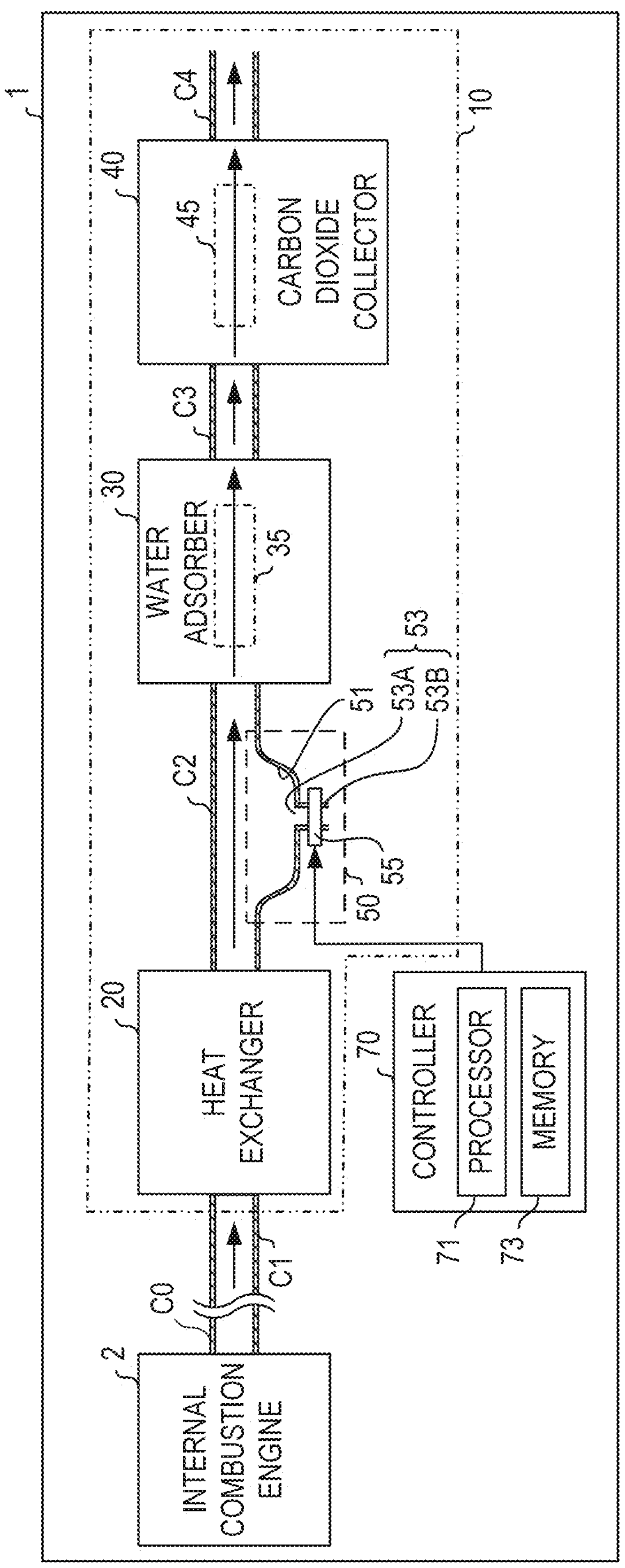
FIG. 1 is a diagram showing a configuration of a carbon dioxide separator in a first embodiment.

As shown in FIG. 1, a carbon dioxide separator 10 of the present embodiment is mounted in a vehicle 1. Examples of the vehicle 1 may include a two-wheeled motor vehicle and a four-wheeled motor vehicle.

The vehicle 1 comprises an internal combustion engine 2. In the internal combustion engine 2, a high-temperature combustion gas is generated by combustion of a fuel-air mixture. This high-temperature combustion gas is discharged into an exhaust passage C0 as exhaust gas. The carbon dioxide separator 10 is connected to an exhaust passage C1 through which the exhaust gas from the exhaust passage C0 passes. These exhaust passages C0 and C1 and other exhaust passages C2, C3, and C4, which are all shown in FIG. 1, are hollow structures that form an exhaust gas flow path, and are each formed of, for example, a conduit pipe for guiding the exhaust gas to an exhaust port (not shown).

Figure 2A:
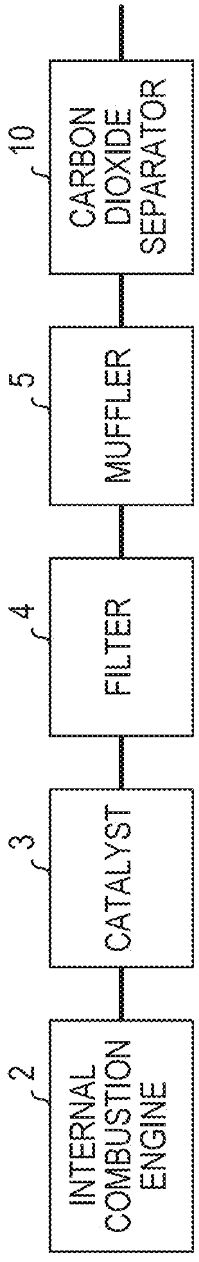
FIG. 2A and FIG. 2B are diagrams each exemplifying arrangement of the carbon dioxide separator.

In a case where the vehicle 1 is a gasoline-powered vehicle, for example as shown in FIG. 2A, a catalyst 3, a filter 4, and a muffler 5 are arranged on the exhaust gas flow path between the internal combustion engine 2 and the carbon dioxide separator 10. In this case, the exhaust passage C1 may be an exhaust passage that communicates with the muffler 5. The carbon dioxide separator 10 is configured to separate carbon dioxide contained in the exhaust gas flowing in from the internal combustion engine 2 through, for example, the catalyst 3, the filter 4, and the muffler 5, from the exhaust gas.

Figure 2B:
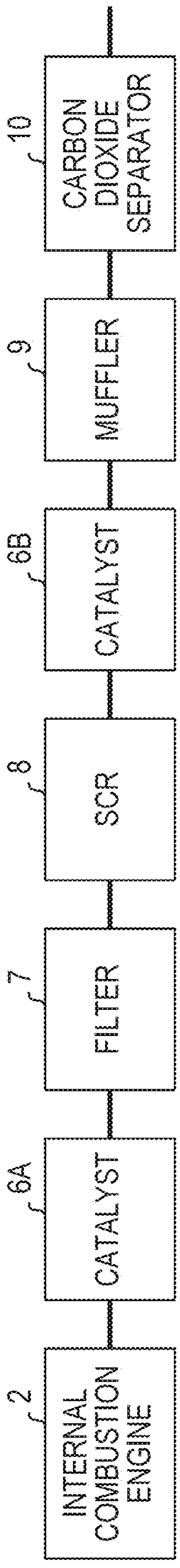

In a case where the vehicle 1 is a diesel-powered vehicle, for example as shown in FIG. 2B, a catalyst 6A, a filter 7, a selective catalytic reduction (SCR) 8, a catalyst 6B, and a muffler 9 are arranged on the exhaust gas flow path between the internal combustion engine 2 and the carbon dioxide separator 10. In this case, the exhaust passage C1 may be an exhaust passage that communicates with the muffler 9. The carbon dioxide separator 10 is configured to separate carbon dioxide contained in the exhaust gas flowing in from the internal combustion engine 2 through, for example, the catalyst 6A, the filter 7, the SCR 8, the catalyst 6B, and the muffler 9, from the exhaust gas.

As shown in FIG. 1, the carbon dioxide separator 10 comprises a heat exchanger 20, a water adsorber 30, and a carbon dioxide collector 40. The heat exchanger 20 is connected to the exhaust passage C1 through which the exhaust gas from the internal combustion engine 2 flows in.

The water adsorber 30 is connected to the heat exchanger 20 through the exhaust passage C2. The carbon dioxide collector 40 is connected to the water adsorber 30 through the exhaust passage C3. Connected to an outlet of the carbon dioxide collector 40 is the exhaust passage C4 that communicates directly or indirectly with the exhaust port for discharging the exhaust gas out of the vehicle 1.

The heat exchanger 20 is configured to cool the exhaust gas flowing in from the internal combustion engine 2 through the exhaust passage C1. The high-temperature exhaust gas from the internal combustion engine 2 is cooled by the heat exchanger 20 to a temperature suitable for collection (adsorption, specifically) of carbon dioxide at the carbon dioxide collector 40. The cooled low-temperature exhaust gas is delivered to the water adsorber 30 through the exhaust passage C2.

The water adsorber 30 functions as a dehydrator. The water adsorber 30 is configured to remove moisture contained in the low-temperature exhaust gas flowing in from the heat exchanger 20 through the exhaust passage C2. The water adsorber 30 comprises a water adsorbent 35 for adsorbing moisture contained in the exhaust gas.

For example, the water adsorbent 35 is filled in the water adsorber 30 so as to generally cover the entirety of a cross section of the exhaust gas flow path perpendicular to an exhaust gas flow direction. Examples of the water adsorbent 35 may include zeolite and alumina as solid adsorbents. The water adsorbent 35 may be configured with a single kind of water adsorbent, or may be configured with two or more kinds of water adsorbents combined together.

The carbon dioxide collector 40 is configured to remove carbon dioxide from the exhaust gas flowing in from the water adsorber 30 through the exhaust passage C3, that is, from the exhaust gas that has passed through the water adsorbent 35. The carbon dioxide collector 40 comprises a carbon dioxide adsorbent 45 for adsorbing carbon dioxide contained in the exhaust gas. In the present embodiment, the carbon dioxide collector 40 functions as a carbon dioxide adsorber.

For example, the carbon dioxide adsorbent 45 is filled in the carbon dioxide collector 40 so as to generally cover the entirety of a cross section of the exhaust gas flow path perpendicular to the exhaust gas flow direction. Examples of the carbon dioxide adsorbent 45 may include zeolite, an activated carbon, and a metal organic framework (MOF) as solid adsorbents. These solid adsorbents and so on are porous materials with high surface areas.

The carbon dioxide separator 10 further comprises a draining structure 50 on the exhaust passage C2 that forms the exhaust gas flow path between the heat exchanger 20 and the water adsorber 30.

The lowered temperature of the exhaust gas may result in condensation of part of water vapor, which is moisture contained in the exhaust gas. Such condensation causes part of the water vapor contained in the exhaust gas to change into a liquid. Specifically, liquid water resulting from condensation in the exhaust gas adheres onto an inner wall of the exhaust passage C2 and moves in the exhaust gas flow direction.

The draining structure 50 is provided to inhibit the water resulting from condensation in the exhaust gas from moving along the exhaust passage C2 to flow into the water adsorber 30. Specifically, the draining structure 50 comprises a storage structure 51, a draining port 53, and a valve 55. FIG. 1 schematically shows a sectional shape of the draining structure 50.

The storage structure 51 is configured to store the water resulting from condensation in the exhaust gas. The water resulting from condensation in the exhaust gas falls down, by gravity, to a lower side of the inner wall of the exhaust passage C2, that is, to a bottom of the exhaust passage C2, and then moves along the bottom to flow toward the water adsorber 30. The lower side as used herein corresponds to a direction in which gravity acts.

The exhaust passage C2 is arranged such that the bottom thereof lies horizontally from the heat exchanger 20 toward the water adsorber 30. Alternatively, the water adsorber 30 may be arranged at a position lower than the heat exchanger 20, and the exhaust passage C2 may be obliquely arranged such that the bottom thereof forms a downward slope from the heat exchanger 20 toward the water adsorber 30.

The storage structure 51 is provided to the bottom of the exhaust passage C2, which is a main passage for the water. The storage structure 51 corresponds to a recessed structure formed in the inner wall of the exhaust passage C2. The storage structure 51 has its bottom at a position lower than surrounding areas in the exhaust passage C2 in order to collect the water from the surrounding areas and store the collected water. To collect the water, the storage structure 51 is configured such that the bottom surface thereof is slanted toward a lowest part.

The bottom of the storage structure 51 is provided with the draining port 53 for discharging the water collected and stored by the storage structure 51. The draining port 53 comprises a bottom opening 53A for water draining arranged in the bottom of the storage structure 51 and a drainpipe 53B, which is a hollow pipe extending downward from the bottom opening 53A. The bottom opening 53A is arranged in the lowest part of the storage structure 51.

The drainpipe 53B has a first end that communicates with the bottom opening 53A and a second end opposite the first end. The second end communicates with the outside of the vehicle 1. Thus, the water falling from the bottom opening 53A is discharged out of the vehicle 1.

The valve 55 is provided to an upper part of the drainpipe 53B and configured to be able to change a flow rate of the water to flow downward of the valve 55 through the draining port 53. The valve 55 is configured as, for example, an electric valve driven by an electric motor, and is configured to open and close the draining port 53 in accordance with a control signal from a controller 70 provided in the vehicle 1.

In a state where the valve 55 is closed, the flow path below the valve 55 is blocked by the valve 55. This inhibits the water from flowing out through the draining port 53, thus storing the water in the storage structure 51.

In a state where the valve 55 is open, the flow path below the valve 55 is opened. This allows the water collected and stored in the storage structure 51 to be discharged to the outside through the draining port 53.

The controller 70 is provided in the vehicle 1 to control the valve 55 in the carbon dioxide separator 10. In an alternative example, an electronic control unit (ECU) provided for a vehicle control, which is different from a valve control, may function as the controller 70.

Figure 3:
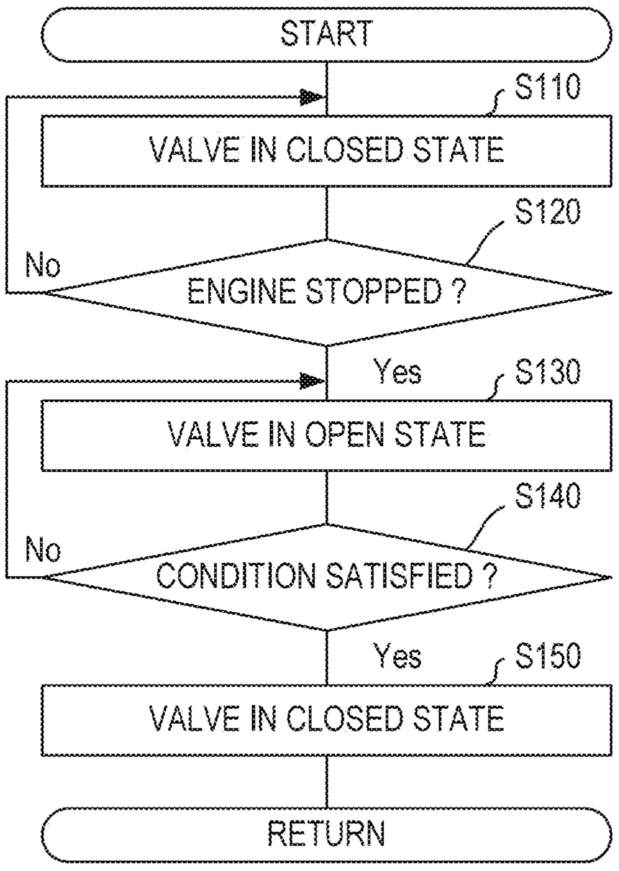
FIG. 3 is a flowchart showing a valve control process performed by a controller.

The controller 70 comprises a processor 71 and a memory 73. The memory 73 stores a computer program for causing the processor 71 to perform a valve control process shown in FIG. 3. The processor 71 performs the valve control process shown in FIG. 3 repeatedly, to thereby control the valve 55 so that the valve 55 is maintained in a closed state while the exhaust gas is generated in the internal combustion engine 2.

In the valve control process, the processor 71 maintains the valve 55 in a closed state until the internal combustion engine 2 stops (S110, S120). This is because the exhaust gas generated in the internal combustion engine 2 may flow out through the draining port 53 while the internal combustion engine 2 is not in a stop state, that is, while the internal combustion engine 2 is in operation. For example, the processor 71 can determine whether the internal combustion engine 2 is in operation or in a stop state by receiving input of signals indicating on/off of an ignition switch.

Upon determining that the internal combustion engine 2 has stopped (S120: Yes), the processor 71 controls the valve 55 so that the valve 55 is maintained in an open state until a specified condition is satisfied (S130, S140). This results in discharging the water stored in the storage structure 51 to the outside through the draining port 53.

The processor 71 may maintain the valve 55 in the open state until the internal combustion engine 2 starts operation. Alternatively, the processor 71 may maintain the valve 55 in the open state until a specified period of time passes. The specified period of time may be that estimated in advance as a period of time required for all the water stored in the storage structure 51 to flow out.

Upon determining that the specified condition is satisfied (S140: Yes), the processor 71 controls the valve 55 so that the valve 55 is switched into a closed state (S150). This results in closing the draining port 53. The processor 71 performs such a process repeatedly, to thereby control timing of drainings so as to inhibit the exhaust gas from flowing out.

Figure 4:
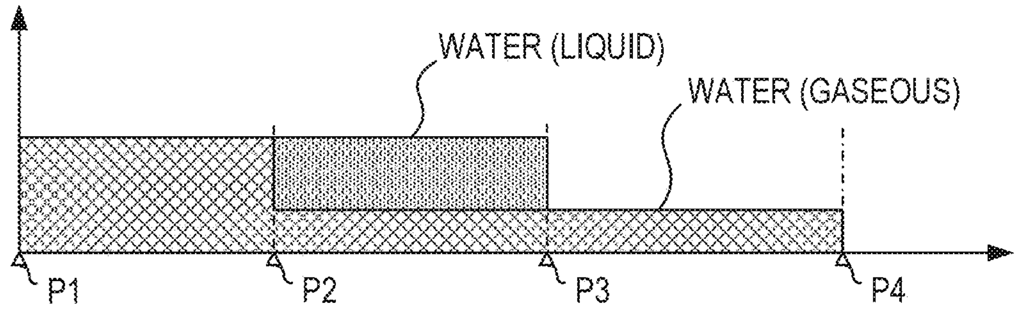
FIG. 4 is a graph showing a residual amount of water in a flow path for exhaust gas.

FIG. 4 conceptually shows, with a graph, change in a residual amount of the water in the exhaust gas flow path from the internal combustion engine 2 to the water adsorber 30. In the graph of FIG. 4, the vertical axis represents the residual amount of the water, and the horizontal axis represents a position on the exhaust gas flow path.

A position P1 shown in the graph corresponds to a point of connection between the internal combustion engine 2 and the exhaust passage C0. A position P2 corresponds to a point of connection between the heat exchanger 20 and the exhaust passage C2. A position P3 corresponds to a point where the draining structure 50 is arranged. A position P4 corresponds to a point of connection between the exhaust passage C2 and the water adsorber 30.

As described above, the water vapor contained in the exhaust gas is condensed as the temperature is lowered, and is separated from the exhaust gas as liquid water. Since the exhaust gas is forcibly cooled in the heat exchanger 20, an amount of the water vapor flowing into the exhaust passage C2 at the position P2 decreases as compared with that at the position P1, and instead, an amount of the liquid water increases.

In a conventional configuration in which the draining structure 50 is not present, the liquid water moves to the position P4 together with the water vapor and flows into the water adsorber 30. On the other hand, in the present embodiment, presence of the draining structure 50 allows almost all the liquid water to be removed at the position P3. The water to reach the position P4 consists mostly of the water vapor contained in the exhaust gas.

Accordingly, the present embodiment makes it possible to significantly reduce the amount of water that has to be adsorbed in the water adsorber 30 as compared with the case where the draining structure 50 is not present. In other words, a water adsorptive capacity required of the water adsorber 30 can be significantly lowered.

The water adsorptive capacity of the water adsorber 30 correlates with an amount of the adsorbent. Lowering the required adsorptive capacity enables reduction in the required amount of the adsorbent in the water adsorber 30, thus enabling the water adsorber 30 to be designed smaller and lighter.

Consequently, the present embodiment makes it possible to lower a dehydration capacity required for treatment of the exhaust gas, thus providing the carbon dioxide separator 10 with reduced size and weight that can collect carbon dioxide effectively.

Second Embodiment

Next, the carbon dioxide separator 10 of a second embodiment will be described. The carbon dioxide separator 10 of the second embodiment is substantially the same as that of the first embodiment except for a draining structure 80. Thus, a configuration of the draining structure 80 will be selectively described below with reference to FIG. 5.

The carbon dioxide separator 10 of the second embodiment comprises the draining structure 80 at a position adjacent to the water adsorber 30 on the exhaust passage C2 between the heat exchanger 20 and the water adsorber 30.

The water adsorber 30 includes the water adsorbent 35 within a housing 31 that forms the exhaust gas flow path. The water adsorbent 35 is filled in the housing 31 so as to generally cover the entirety of a cross section of the housing 31 perpendicular to the exhaust gas flow direction.

Figure 5:
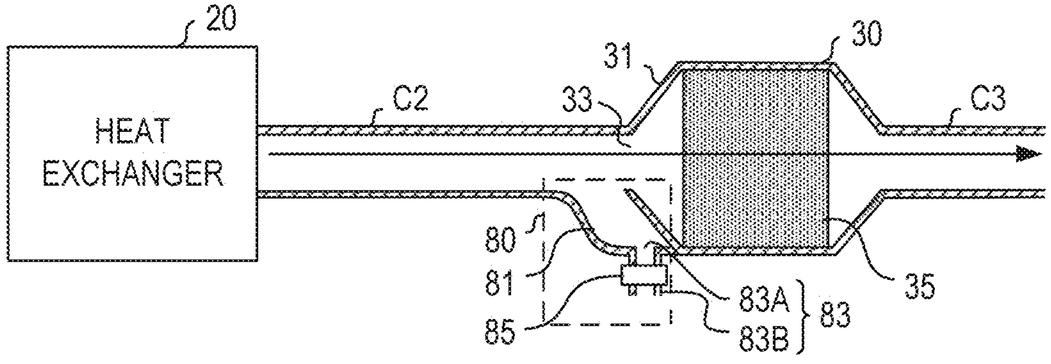
FIG. 5 is a diagram showing a draining structure in a second embodiment.

The draining structure 80 comprises a storage structure 81, a draining port 83, and a valve 85 as elements for inhibiting the water resulting from condensation in the exhaust gas from flowing into the water adsorber 30. FIG. 5 schematically shows sectional shapes of the draining structure 80 and the water adsorber 30.

The storage structure 81 is provided to the lower side of the inner wall of the exhaust passage C2, that is, to a bottom of the exhaust passage C2, at a point of connection between the housing 31 of the water adsorber 30 and the exhaust passage C2. The storage structure 81 forms a water storage space divided from a space for housing the water adsorbent 35 within the housing 31. The water storage space corresponds to a space surrounded by an inner wall of the exhaust passage C2 recessed to the lower side and an outer wall of the housing 31.

The water storage space is arranged lower than an inflow port 33 for the exhaust gas in the water adsorber 30. Thus, when the water resulting from condensation in the exhaust gas moves along the exhaust passage C2 toward the water adsorber 30, the water is stored in the storage structure 81 without reaching the water adsorber 30.

To discharge the water stored in the storage structure 81, the draining port 83 comprises a bottom opening 83A for water draining arranged in the bottom of the storage structure 81 and a drainpipe 83B, which is a hollow pipe extending downward from the bottom opening 83A.

To collect the water, the storage structure 81 is configured such that the bottom surface thereof is slanted toward a lowest part. The bottom opening 83A is arranged in the lowest part of the storage structure 81. The drainpipe 83B is configured such that the water falling from the bottom opening 83A can be discharged out of the vehicle 1 similarly to the drainpipe 53B.

The valve 85 is provided to the drainpipe 83B and configured to be able to change a flow rate of the water to flow downward of the valve 85 through the draining port 83. Similarly to the valve 55, the valve 85 is configured as an electric valve and controlled to open and close by the controller 70 provided to the vehicle 1.

In the present embodiment, the draining structure 80 is present at a position very close to the water adsorbent 35, on the exhaust gas flow path before a point where the exhaust gas reaches the water adsorbent 35. This makes it possible to discharge most of the water separated from the exhaust gas before reaching the water adsorbent 35, including the water resulting from condensation at a position close to the water adsorbent 35.

Consequently, the present embodiment enables reduction in size and weight of the water adsorber 30, thus providing the carbon dioxide separator 10 preferred especially for being mounted in vehicles.

Third Embodiment

Next, the carbon dioxide separator 10 of a third embodiment will be described. The carbon dioxide separator 10 of the third embodiment is substantially the same as that of the first embodiment except for a draining structure 90. Thus, a configuration of the draining structure 90 will be selectively described below with reference to FIG. 6.

Figure 6:
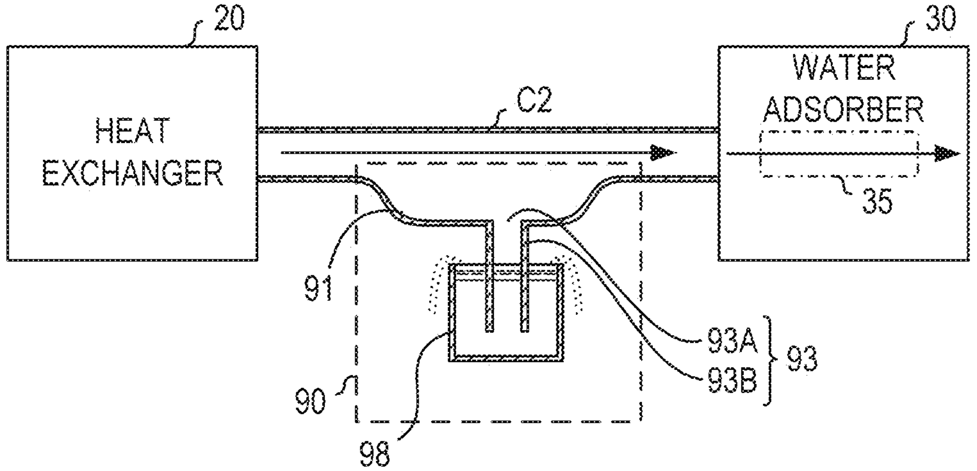
FIG. 6 is a diagram showing a draining structure in a third embodiment.

The carbon dioxide separator 10 of the third embodiment comprises the draining structure 90 at a bottom of the exhaust passage C2 between the heat exchanger 20 and the water adsorber 30. The draining structure 90 comprises a recessed structure 91, a draining port 93, and a tank 98. FIG. 6 schematically shows a sectional shape of the draining structure 90.

The recessed structure 91 is configured similarly to the storage structure 51 of the first embodiment. Also, similarly to the draining port 53 of the first embodiment, the draining port 93 comprises a bottom opening 93A for water draining arranged in the bottom of the recessed structure 91 and a drainpipe 93B.

In the present embodiment, however, the drainpipe 93B is not provided with a valve. The drainpipe 93B is arranged such that its end is soaked in the water filled in the tank 98. Specifically, the drainpipe 93B has a first end that is connected to the recessed structure 91 and a second end opposite the first end. The drainpipe 93B is arranged such that the second end is positioned below a water surface in the tank 98. Such an arrangement allows the drainpipe 93B to be closed by the water at the second end thereof so that the exhaust gas does not flow out.

The water resulting from condensation in the exhaust gas flows into the recessed structure 91 having a bottom lower than surrounding areas, in the process of moving along the exhaust passage C2. The water that has flowed into the recessed structure 91 falls from the bottom opening 93A into the tank 98 through the drainpipe 93B.

The tank 98 is arranged such that, in a state of being completely filled with water, the water surface therein is positioned below the first end of the drainpipe 93B. Thus, when the water falling into the tank 98 causes increase in an amount of water in the tank 98, the water overflows from the tank 98 without the water level in the drainpipe 93B reaching the level of the first end.

As described so far, the draining structure 90 of the present embodiment makes it possible to discharge the water collected in the recessed structure 91 to the outside as the water overflowing from the tank 98. With this draining structure 90, the water collected in the recessed structure 91 can be discharged to the outside while inhibiting outflow of the exhaust gas without using a valve.

Other Embodiments

The present disclosure is not limited to the above-described embodiments, and can be embodied in various forms. For example, application of the technique of the present disclosure is not limited to that to the carbon dioxide separator 10 to be mounted in vehicles. Specifically, the technique of the present disclosure may be applied to carbon dioxide separators installed at general homes, offices, factories, and so on to treat the exhaust gas from combustors or incinerators. The draining structures 50 and 80 do not necessarily have to include the valve 55 and 85, respectively.

The carbon dioxide separator 10 may be provided with, as a dehydrator and instead of the water adsorber 30, a filter that removes moisture from the exhaust gas using a separation membrane. The separation membrane may be formed of a membrane material with properties of allowing the exhaust gas to pass therethrough but not allowing the moisture contained in the exhaust gas to pass therethrough. In a case where an amount of water flowing into the separation membrane correlates with a dehydration capacity of the filter, it is possible to reduce the size and installation costs of the filter by applying the technique of the present disclosure.

The carbon dioxide collector 40 may be configured as a carbon dioxide absorber that absorbs carbon dioxide from the exhaust gas by chemical absorption. In this case, the carbon dioxide absorber may separate carbon dioxide from the exhaust gas by using, for example, a liquid material such as an amine solution as a carbon dioxide absorbent. That is, it may be understood that “collect/collection” as used herein includes concepts of both “adsorb/adsorption” and “absorb/absorption”.

Figure 7:
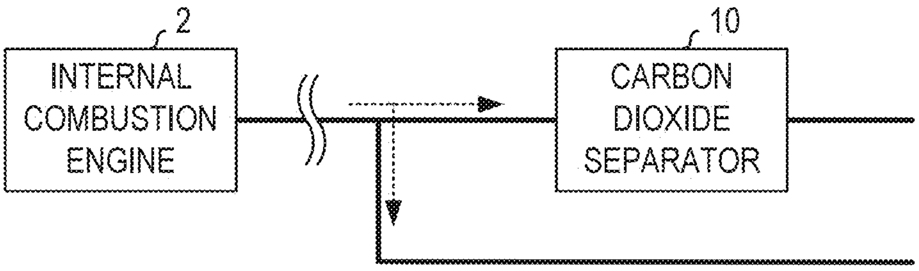
FIG. 7 is a diagram explaining an example in which part of the exhaust gas flows into the carbon dioxide separator.

As shown in FIGS. 2A and 2B, the carbon dioxide separator 10 may be arranged so as to treat the exhaust gas flowing in directly or indirectly from the internal combustion engine 2. Alternatively, as shown in FIG. 7, the carbon dioxide separator 10 may be for example arranged such that, of the exhaust gas from the internal combustion engine 2, only part of the exhaust gas that has branched off via a valve, a separation membrane, and so on flows in. In this case, the carbon dioxide separator 10 may function so as to separate carbon dioxide from part of the exhaust gas generated in the internal combustion engine 2.

The function/functions of a single element in the above-described embodiments may be performed by two or more elements in a distributed manner. The function/functions of two or more elements may be performed by a single element in an integrated manner. Part of the configuration in the above-described embodiments may be omitted. At least part of the configuration in the above-described embodiments may be added to or replace a configuration in other embodiments. Any and all modes encompassed by the technical ideas specified by the language of the claims are embodiments of the present disclosure.

Technical Ideas Disclosed Herein

It is to be understood that this specification discloses technical ideas as below.

Item 1

A carbon dioxide separator comprising:
a dehydrator connected to a heat exchanger configured to cool an exhaust gas discharged from an internal combustion engine, the dehydrator being configured to remove moisture contained in the exhaust gas flowing in from the heat exchanger;
a carbon dioxide collector configured to adsorb and/or absorb carbon dioxide contained in the exhaust gas that has passed through the dehydrator; and
a draining structure provided on a flow path for the exhaust gas between the heat exchanger and the dehydrator, the draining structure being configured to inhibit water resulting from condensation in the exhaust gas from moving along the flow path to flow into the dehydrator.

Item 2

The carbon dioxide separator according to Item 1,
wherein the carbon dioxide collector comprises zeolite as a carbon dioxide adsorbent.

Item 3

The carbon dioxide separator according to Item 1 or 2,
wherein the carbon dioxide separator is mounted in a vehicle including the internal combustion engine.

Item 4

The carbon dioxide separator according to any one of Items 1 to 3,
wherein the draining structure includes:
a recessed structure configured to collect the water resulting from condensation in the exhaust gas; and
a draining port configured to discharge the water collected by the recessed structure.

Item 5

The carbon dioxide separator according to Item 4,
wherein the draining port includes a valve configured to control a timing of draining.

What is claimed is:

1. A carbon dioxide separator comprising:
a dehydrator connected to a heat exchanger configured to cool an exhaust gas discharged from an internal combustion engine, the dehydrator being configured to remove moisture contained in the exhaust gas flowing in from the heat exchanger;
a carbon dioxide collector configured to adsorb and/or absorb carbon dioxide contained in the exhaust gas that has passed through the dehydrator; and
a draining structure provided on a flow path for the exhaust gas between the heat exchanger and the dehydrator, the draining structure being configured to inhibit water resulting from condensation in the exhaust gas from moving along the flow path to flow into the dehydrator.

2. The carbon dioxide separator according to claim 1, wherein the carbon dioxide collector comprises zeolite as a carbon dioxide adsorbent.

3. The carbon dioxide separator according to claim 1, wherein the carbon dioxide separator is mounted in a vehicle including the internal combustion engine.

4. The carbon dioxide separator according to claim 2, wherein the carbon dioxide separator is mounted in a vehicle including the internal combustion engine.

5. The carbon dioxide separator according to claim 1, wherein the draining structure includes:
a recessed structure configured to collect the water resulting from condensation in the exhaust gas; and
a draining port configured to discharge the water collected by the recessed structure.

6. The carbon dioxide separator according to claim 2, wherein the draining structure includes:
a recessed structure configured to collect the water resulting from condensation in the exhaust gas; and
a draining port configured to discharge the water collected by the recessed structure.

7. The carbon dioxide separator according to claim 3, wherein the draining structure includes:
a recessed structure configured to collect the water resulting from condensation in the exhaust gas; and
a draining port configured to discharge the water collected by the recessed structure.

8. The carbon dioxide separator according to claim 4, wherein the draining structure includes:
a recessed structure configured to collect the water resulting from condensation in the exhaust gas; and
a draining port configured to discharge the water collected by the recessed structure.

9. The carbon dioxide separator according to claim 5, wherein the draining port includes a valve configured to control a timing of draining.

10. The carbon dioxide separator according to claim 6, wherein the draining port includes a valve configured to control a timing of draining.

11. The carbon dioxide separator according to claim 7, wherein the draining port includes a valve configured to control a timing of draining.

12. The carbon dioxide separator according to claim 8, wherein the draining port includes a valve configured to control a timing of draining.

* * * * *